June 13, 1950 P. E. BERGEN 2,511,690
TIRE TREAD
Filed March 25, 1948
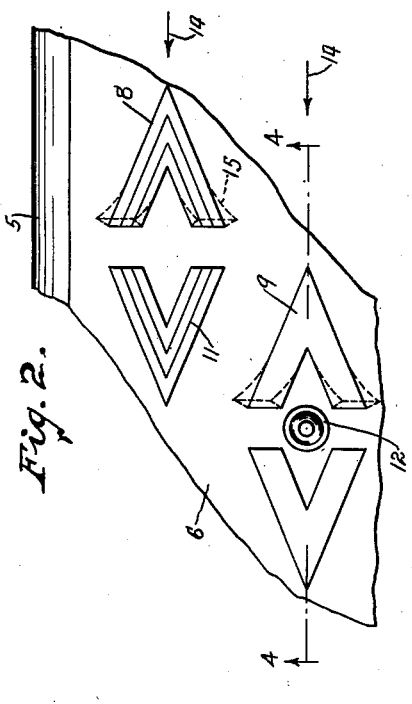
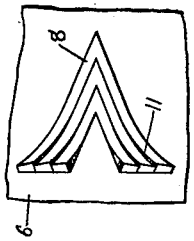
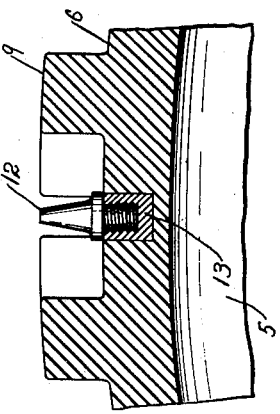
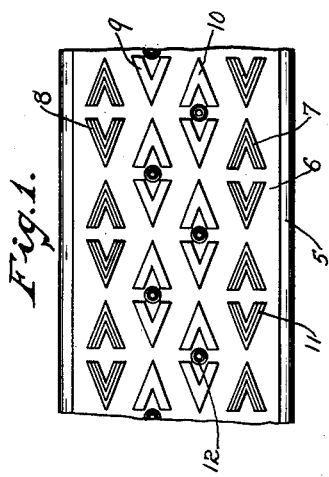
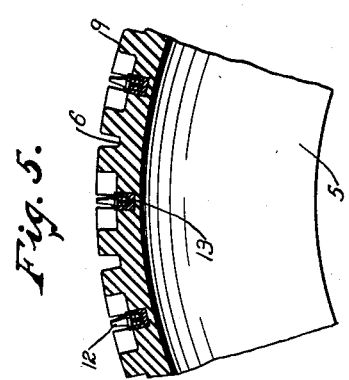
INVENTOR.
PHILIP E. BERGEN.
BY Louis V. Lucia
ATTORNEY.

Patented June 13, 1950

2,511,690

UNITED STATES PATENT OFFICE 2,511,690

TIRE TREAD

Philip E. Bergen, Farmington, Conn.

Application March 25, 1948, Serial No. 16,940

7 Claims. (Cl. 152—209)

This invention relates to tire treads and more particularly to treads for providing increased traction, such as disclosed in my co-pending application S. No. 750, 917, filed May 28, 1947, now abandoned.

It is an object of this invention to provide a tire tread having metallic calks mounted thereon and, more particularly, to provide road engaging bosses or projections on said tread which will support the vehicle carried by the tire and which are yieldable under the driving action of the tire to permit the said calks in the tread to engage the road surface.

It is a further object of the invention to provide on a tire tread bosses which will improve the traction of the tire under ordinary conditions and which, upon the application of an abnormal pull on said tread, will lower the tire towards the surface of the road and permit the calks therein to more firmly engage said surface.

Further objects and advantages of the invention will be more clearly understood from the following description and from the accompanying drawings, in which—

Fig. 1 is a view on reduced scale showing a portion of a tire with my improved tread thereon.

Fig. 2 is an enlarged plan view of a portion of a tire embodying my invention.

Fig. 3 is a similar view showing the operation of one of the road engaging bosses in said tread.

Fig. 4 is a sectional side view on line 4—4 of Fig. 2.

Fig. 5 is a side view of my improved tread in central vertical section.

As shown in the drawings, the numeral 5 denotes a conventional tire such as commonly used on motor vehicles. My invention provides for said tires a tread 6 which preferably includes rows of V-shaped bosses 7—8 at opposite sides of said tread and similar rows of bosses 9—10 intermediate the said rows 7—8. The bosses 7—8 are slit, as indicated at 11, so as to provide what may be termed a squeegee surface, which includes a plurality of nested V-shaped ribs in each of said bosses.

The intermediate bosses 9—10 are preferably solid. These bosses are spaced apart and oppositely disposed so as to provide a recess between them within which is mounted a calk 12 that may be secured to a base 13 that is inserted in the tread of the tire.

In the normal use of said tread, the solid bosses 9—10 together with the slit bosses 7—8, will support the weight of the vehicle in such a manner that only a normal amount of pressure will be applied between the ends of the calks 12 and the road surface. Upon movement of said tread over a surface and relatively thereto, such as would occur at times when the tread is in engagement with slippery surfaces, slippage between the bosses 7, 8, 9 and 10 in the direction indicated by the arrow 14 in Fig. 2 will cause the ends of the bosses leading in that direction to open outwardly, as indicated in dotted lines at 15. This will cause the said bosses to reduce their normal height and thereby permit the ends of the calks 12 to be pressed into engagement with the road.

As illustrated in Fig. 3, the ends of the squeegee projections will bend outwardly and thereby increase the grip with the road surface and at the same time reduce its load carrying capacity. This will cause a greater portion of the load to be applied upon the calks 12 and thereby cause the calks to bite into the road surface and provide increased traction for the tire.

I have found by extensive experiments that my invention is highly efficient and that it will operate as above described and cause said calks to engage slippery surfaces, such as icy roads, and thereby prevent skidding and slipping.

My improved tread has also been found highly beneficial in providing traction in snow. Under such conditions, any snow which may pack between the V-shaped bosses becomes loosened as the bosses flex, on the dotted lines indicated at 15, and permit the said snow to be thrown off the tread by centrifugal force applied thereon as the tire rotates.

I claim:

1. A tire tread of the character described comprising pairs of separated opposed U-shaped bosses and metallic calks embedded in said tire between said bosses, the said bosses being adapted to support said tire and to yield so as to permit pressure to be applied upon said calks for engaging a road surface and providing traction for the tire.

2. A tire tread of the character described comprising a plurality of V-shaped bosses disposed in pairs with the top of one V in spaced relation to the top of the adjacent V, thereby providing a partially enclosed space between said V's, and a metallic calk mounted within said space.

3. A tire tread of the character described comprising a plurality of V-shaped bosses extending from said tread, the said bosses having the tops of the V's adjacent to each other and the points of said V's extending in opposite directions and thereby providing a space partially enclosed by the tops of the said V's, and a metallic calk projecting from said tread within said space.

4. A tire tread as set forth in claim 3 wherein said bosses are adapted to flex under abnormal pull from said tread relatively to a road surface and thereby lessen the height of said bosses and permit increased pressure between the ends of the calks and the road surface.

5. A tire tread of the character described comprising a plurality of V-shaped bosses, the tops of the V's thereof being adjacent to each other and the points of said V's extending in opposite directions whereby a partially enclosed space is provided between said V's, a metallic calk mounted within said space and extending upwardly from the bottom thereof to a point substantially on a plane with the tops of the bosses, some of said bosses being solid and others being slit to provide squeegees, those of said bosses having the tops of the V's meeting in the direction of abnormal movement between the tread and the road surface being adapted to flare outwardly and thereby reduce the height of the said bosses and permit a greater proportion of the load to be applied to the calks for increasing the pressure of said calks upon the road surface.

6. A tire of the character described comprising a tread including a plurality of rows of V-shaped bosses extending around said tire, the intermediate rows of said bosses being solid and the outer rows being slit for substantially the entire depth thereof, the said bosses being of V-shape and having the tops of the V's adjacent to but spaced from each other and the points thereof extending in opposite directions, whereby partially enclosed spaces are provided between the open ends of the V's, a calk mounted within said space between each pair of solid bosses, the said pairs of solid bosses being staggered crosswise to the tread whereby there is provided on a single plane crosswise to the tread a pair of slit bosses and a pair of solid bosses and the said calks are staggered around the tire.

7. A tire tread of the character described comprising annular rows of bosses projecting therefrom, each of said rows including pairs of V-shaped bosses having their open ends adjacent to each other and their pointed ends extending in opposite directions and thereby providing a partially enclosed space between said open ends, the outer rows of said bosses being slit for substantially the entire depth thereof and the bosses in the intermediate rows being solid, a calk secured in the space between each pair of solid bosses, the said bosses being staggered whereby there is provided a pair of slit bosses and a pair of solid bosses in alignment crosswise to the tread and the said calks are thereby staggered around said tread.

PHILIP E. BERGEN.

REFERENCES CITED

The following references are of record in the file of this patent:

UNITED STATES PATENTS

| Number | Name | Date |
| --- | --- | --- |
| D. 79,686 | Hower | Oct. 22, 1929 |
| 1,377,283 | Schenuit | May 10, 1921 |
| 1,504,694 | Litchfield | Aug. 12, 1924 |
| 2,121,956 | Eger | June 28, 1938 |
| 2,498,523 | Bergen | Feb. 21, 1950 |